US012803780B2

(12) United States Patent
Larmuseau

(10) Patent No.: US 12,803,780 B2
(45) Date of Patent: Nov. 17, 2026

(54) METHODS AND SYSTEMS FOR COMPRESSED FAST ENCRYPTED SIMILARITY SEARCHING AND DATABASE ANALYSIS

(71) Applicant: KONINKLIJKE PHILIPS N.V., Eindhoven (NL)

(72) Inventor: Adriaan Joris H. Larmuseau, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/729,986

(22) PCT Filed: Jan. 9, 2023

(86) PCT No.: PCT/EP2023/050341
§ 371 (c)(1),
(2) Date: Jul. 18, 2024

(87) PCT Pub. No.: WO2023/138937
PCT Pub. Date: Jul. 27, 2023

(65) Prior Publication Data
US 2025/0150255 A1 May 8, 2025

(30) Foreign Application Priority Data
Jan. 20, 2022 (WO) ................ PCT/CN2022/072853

(51) Int. Cl.
*H04L 9/00* (2022.01)
*G06F 16/953* (2019.01)

(52) U.S. Cl.
CPC ............ *H04L 9/008* (2013.01); *G06F 16/953* (2019.01)

(58) Field of Classification Search
CPC ............................... H04L 9/008; G06F 16/953
See application file for complete search history.

(56) References Cited

U.S. PATENT DOCUMENTS 9,712,320 B1 * 7/2017 Kiayias ................. H04L 9/0662
10,762,229 B2 * 9/2020 Sion .................... H04L 67/1097
(Continued)

OTHER PUBLICATIONS

A Fully Homomorphic Encryption Scheme (Year: 2008).*
(Continued)

*Primary Examiner* — Kendall Dolly
*Assistant Examiner* — Thomas A Carnes

(57) ABSTRACT

A method (100) for encrypted similarity searching of a database, comprising: (i) providing (120) a database comprising a plurality of homomorphically-encrypted fixed-length data fingerprints; (ii) receiving (130) an encrypted query; (iii) generating (140) a fixed-length query data fingerprint; (iv) homomorphically encrypting (150) the fixed-length query data fingerprint; (v) generating (160) a fixed-size query data fingerprint table; (vi) comparing (170) the homomorphically-encrypted fixed-length query data fingerprint to every homomorphically-encrypted fixed-length data fingerprint, wherein each comparison generates a distance; (vii) identifying (180), using the generated distance between the homomorphically-encrypted fixed-length query data fingerprint and every homomorphically-encrypted fixed-length data fingerprint, one or more data files in the database having a minimal generated distance; and (viii) reporting (190) the identified one or more data files.

18 Claims, 4 Drawing Sheets

(56) References Cited

U.S. PATENT DOCUMENTS

| | | | | |
|---|---|---|---|---|
| 2008/0281811 | A1* | 11/2008 | Korst | G06F 16/313 707/E17.084 |
| 2013/0238646 | A1* | 9/2013 | Maro | G06F 21/6227 707/E17.135 |
| 2016/0132692 | A1* | 5/2016 | Kerschbaum | G06F 21/6227 713/189 |
| 2017/0063526 | A1* | 3/2017 | Kahrobaei | H04L 9/008 |
| 2017/0308580 | A1* | 10/2017 | Naganuma | H04L 63/0428 |
| 2018/0278410 | A1* | 9/2018 | Hirano | G06F 16/903 |
| 2018/0285576 | A1* | 10/2018 | Cannings | G06N 3/02 |
| 2018/0337788 | A1* | 11/2018 | Gajek | H04L 9/14 |
| 2019/0044697 | A1* | 2/2019 | Paz de Araujo | H04L 63/0428 |
| 2019/0340381 | A1* | 11/2019 | Yavuz | G06F 21/606 |
| 2020/0151356 | A1* | 5/2020 | Rohloff | G06F 21/6245 |
| 2020/0184278 | A1* | 6/2020 | Zadeh | G06N 3/044 |
| 2020/0228308 | A1* | 7/2020 | Shainski | G06F 21/6227 |
| 2020/0403781 | A1* | 12/2020 | Gentry | H04L 9/0618 |
| 2021/0098092 | A1* | 4/2021 | Katuwal | G06F 16/152 |
| 2022/0121770 | A1* | 4/2022 | Cousins | H04L 9/0643 |
| 2022/0368545 | A1* | 11/2022 | Han | H04L 9/50 |

OTHER PUBLICATIONS

Computing Arbitrary Functions of Encrypted Data (Year: 2009).*

Private Database Queries Using Somewhat Homomorphic Encryption (Year: 2013).*

Gentry, C. et al., "Homomorphic encryption from learning with errors: Conceptually-simpler, asymptotically-faster, attribute-based". In Crypto (1), vol. 8042 of Lecture Notes in Computer Science, pp. 75-92. Springer, 201.

Cetin, G.S. et al., "Private queries on encrypted genomic data" In BMC Medical Genomics 2017, 10(Suppl 2):45.

Sim, J.J. et al., "Achieving GWAS with Homomorphic Encryption", BMC Medical Genomics, 2020, 13 (Suppl 7):90.

Chen, H. et al., "Logistic regression over encrypted data from fully homomorphic encryption", BMC Medical Genomics 2018, 11(Suppl 4):81.

Engelsm, J. J. et al., "HERS: Homomorphically Encrypted Representation Search". in IEEE Transactions on Biometrics, Behavior, and Identity Science, vol. 4, No. 3, pp. 349-360, Jul. 2022.

Pratapa, M., "A New Approach for Homomorphic Encryption with Secure Function Evaluation on Genomic Data", (Aug. 18, 2020), pp. 1-114.

Cheon, J.H. et al., "Search-and-compute on Encryptd Data", IACR, International Association for Cryptologic Research, vol. 20141011:235048, (Oct. 8, 2014), pp. 1-27.

International Search Report for PCT/EP2023/050341 filed Jan. 9, 2023.

Fan, J. et al., "Somewhat Practical Fully Homomorphic Cryption". Cryptology ePrint Archive, Report 2012/133.

Lyubashevsky, V. et al., "On Ideal Lattices and Learning with Errors Over Rings". Cryptology dPrint Archive, 2013.

* cited by examiner

METHODS AND SYSTEMS FOR COMPRESSED FAST ENCRYPTED SIMILARITY SEARCHING AND DATABASE ANALYSIS

CROSS-REFERENCE TO PRIOR APPLICATIONS

This application claims the priority benefit under 35 U.S.C. § 371 of International Patent Application No. PCT/EP2023/050341, filed on Jan. 9, 2023, which claims the priority benefit of Application No. PCT/CN2022/072853 filed on Jan. 20, 2022.

FIELD OF THE DISCLOSURE

The present disclosure is directed generally to methods and systems for encrypted similarity searching of data.

BACKGROUND

Many data applications require similarity searching. In the medical field, for example, finding patients and/or treatments with similar features can provide insight into patient trajectory, forecast, and/or prediction, patient treatment, and much more. Thus, identifying similar patients can have a huge benefit on patient healthcare outcomes. One concern associated with similarity searching of medical data in a medical database is that searching for similar patients can require the transmission or communication of privacy sensitive medical information. This transmission of sensitive information can be a regulatory issue as well as a privacy and/or security risk.

Many electronic health record systems utilize the Fast Healthcare Interoperability Resource (FHIR) format, created by the Health Level Seven International (HL7) healthcare standards organization, to store and communicate medical data. FHIR is a standard that describes data formats and elements (i.e., resources) as well as an API for exchanging electronic health records. However, FHIR files can be very large files and thus similarity searching using FHIR files can be an onerous process.

One approach is the use of zk-SNARKs (zero-knowledge Succinct Non-interactive Arguments of Knowledge), which are a cryptographic proof technique for establishing knowledge or ownership in a manner that preserves confidentiality while minimizing the amount of bandwidth used for communication. While this approach enables parties to prove properties of the computations, it does not perform the computations themselves in a fully encrypted way.

Another approach for safe similarity searching of medical data is the searching of data while it is still encrypted. Thus, current methods explore the use of methods such as homomorphic encryption which enables analysis of data while it is encrypted. However, homomorphic solutions are severely limited in the amount of data they can process. As such, even the best solutions remain too limited for real world use.

SUMMARY OF THE DISCLOSURE

Accordingly, there is a continued need in the art for methods and systems that enable quick and efficient similarity searching of a database while ensuring the privacy and security of the query.

The present disclosure is directed to inventive methods and systems for similarity searching of a database. Various embodiments and implementations herein are directed to a method and system configured for querying a database using homomorphic encryption. According to an embodiment, a homomorphically-encrypted fixed-length query data fingerprint is queried against a homomorphically-encrypted database to identify distances between the query and the data in the database. A similarly search system includes a database comprising a plurality of homomorphically-encrypted fixed-length data fingerprints, each fixed-length data fingerprint representing a data file in the database. The homomorphically-encrypted fixed-length data fingerprints are randomly ordered in a fixed-size query database table in the database. The system receives a query to be queried against the database in a similarity search, generates a fixed-length query data fingerprint, and homomorphically encrypts the fixed-length query data fingerprint. The system generates a fixed-size query data fingerprint table that is the same size as the fixed-size database table, and then compares the fingerprints in the two tables to generate a distance between the query and each fingerprint in the database. The system identifies files in the database with a minimal distance to the query, and reports the distances and/or identified files.

Generally, in one aspect, a method for encrypted similarity searching of a database is provided. The method includes: (i) providing a database comprising a plurality of homomorphically-encrypted fixed-length data fingerprints, each fixed-length data fingerprint representing a data file in the database, wherein the plurality of homomorphically-encrypted fixed-length data fingerprints are randomly ordered in a fixed-size database table; (ii) receiving a query to be queried against the database in a similarity search; (iii) generating, from the received query, a fixed-length query data fingerprint; (iv) homomorphically encrypting the fixed-length query data fingerprint; (v) generating a fixed-size query data fingerprint table, wherein the size of the fixed-size query data fingerprint table is the same as the size of the fixed-size database table; (vi) comparing, using the fixed-size query data fingerprint table and the fixed-size database table, the homomorphically-encrypted fixed-length query data fingerprint to every homomorphically-encrypted fixed-length data fingerprint, wherein each comparison generates a distance; (vii) identifying, using the generated distance between the homomorphically-encrypted fixed-length query data fingerprint and every homomorphically-encrypted fixed-length data fingerprint, one or more data files in the database having a minimal generated distance; and (viii) reporting the identified one or more data files in the database.

According to an embodiment, the method further includes the step of generating the plurality of homomorphically-encrypted fixed-length data fingerprints.

According to an embodiment, the method further includes the step of generating the fixed-size database table comprising the plurality of homomorphically-encrypted fixed-length data fingerprints, wherein the plurality of homomorphically-encrypted fixed-length data fingerprints are randomly ordered within the fixed-size database table.

According to an embodiment, the distance between each homomorphically-encrypted fixed-length data fingerprint and the homomorphically-encrypted fixed-length query data fingerprint is used to populate a distance table, and wherein the distance table is the same size as the fixed-size query data fingerprint table and the fixed-size database table.

According to an embodiment, the distance table is homomorphically encrypted.

According to an embodiment, the generated distance is homomorphically encrypted.

According to an embodiment, the minimal generated distance is determined by a predetermined setting or is user defined.

According to an embodiment, the reporting further comprises the generated distance between the query and the identified one or more data files in the database.

According to an embodiment, the encrypted query is an updated version of a database, and each fixed-length data fingerprint represents a version of a database or a version of a data file in the database.

According to an embodiment, the encrypted query is an updated version of a reference genome, and each fixed-length data fingerprint represents a reference genome.

According to another aspect is a system for encrypted similarity searching of a database. The system includes a database comprising a plurality of homomorphically-encrypted fixed-length data fingerprints, each fixed-length data fingerprint representing a data file in the database, wherein the plurality of homomorphically-encrypted fixed-length data fingerprints are randomly ordered in a fixed-size database table; a query to be queried against the database in a similarity search; and a processor configured to: (i) generate, from the query, a fixed-length query data fingerprint; (ii) homomorphically encrypt the fixed-length query data fingerprint; (iii) generate a fixed-size query data fingerprint table, wherein the size of the fixed-size query data fingerprint table is the same as the size of the fixed-size database table; (iv) compare, using the fixed-size query data fingerprint table and the fixed-size database table, the homomorphically-encrypted fixed-length query data fingerprint to every homomorphically-encrypted fixed-length data fingerprint, wherein each comparison generates a distance; (v) identify, using the generated distance between the homomorphically-encrypted fixed-length query data fingerprint and every homomorphically-encrypted fixed-length data fingerprint, one or more data files in the database having a minimal generated distance; and (vi) generate a report comprising the identified one or more data files in the database.

According to an embodiment, the system further includes a user interface configured to provide the generated report.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. The figures showing features and ways of implementing various embodiments and are not to be construed as being limiting to other possible embodiments falling within the scope of the attached claims. Also, the drawings are not necessarily to scale, emphasis instead generally being placed upon illustrating the principles of the various embodiments.

DETAILED DESCRIPTION OF EMBODIMENTS

Figure 1:
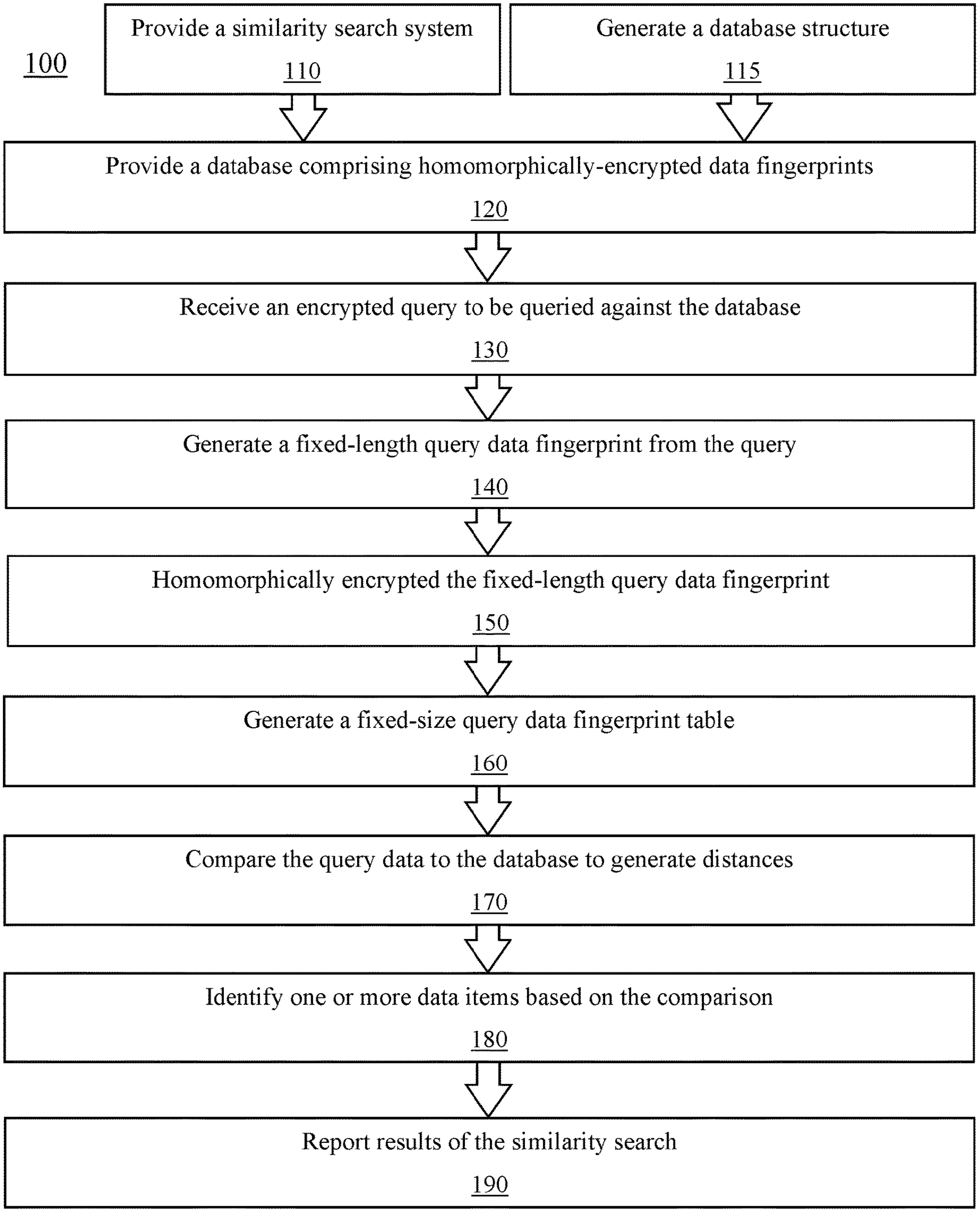
FIG. 1 is a flowchart of a method for encrypted similarity searching of a database, in accordance with an embodiment.

The present disclosure describes various embodiments of a system and method configured to enable searching of homomorphically-encrypted files to ensure privacy and security of those files as well as the query itself. More generally, Applicant has recognized and appreciated that it would be beneficial to provide a method and system to query a database without revealing the content of the query to the database owner. A similarly search system includes a database comprising a plurality of homomorphically-encrypted fixed-length data fingerprints, each fixed-length data fingerprint representing a data file in the database. The homomorphically-encrypted fixed-length data fingerprints are randomly ordered in a fixed-size query database table in the database. The system receives an encrypted query to be queried against the database in a similarity search, generates a fixed-length query data fingerprint, and homomorphically encrypts the fixed-length query data fingerprint. The system generates a fixed-size query data fingerprint table that is the same size as the fixed-size database table, and then compares the fingerprints in the two tables to generate a distance between the query and each fingerprint in the database. The system identifies files in the database with a minimal distance to the query, and reports the distances and/or identified files.

In certain embodiments, researchers and/or healthcare professionals may utilize healthcare or research systems to rapidly find highly similar data files, patients, or other data. One continuing challenge for handling real-world data and finding similar data is the size of the data. The methods and systems described or otherwise envisioned herein create homomorphically-encrypted fingerprints of query and data files, which enables fast and secure searching. In addition to solving the data size issues encountered by the homomorphic encryption of real data, the methods and systems described or otherwise envisioned herein provide additional positive effects. For example, the fast and secure comparison has many use cases, including determining database updates and other similarity searching outcomes. Thus, the methods and systems described or otherwise envisioned herein are highly beneficial in applications where both security and speed or performance are important considerations or requirements.

The embodiments and implementations disclosed or otherwise envisioned herein can be utilized with any system, including but not limited to medical databases or systems. For example, one application of the embodiments and implementations herein is to improve medical monitoring or analysis systems such as, e.g., a Philips® Patient Monitoring system such as the Philips IntelliSpace® Precision Medicine products (manufactured by Koninklijke Philips, N.V.), among many other products. However, the disclosure is not limited to these devices or systems, and thus disclosure and embodiments disclosed herein can encompass any device or system utilizing or otherwise requiring similarity searching or comparison.

Referring to FIG. 1, in one embodiment, is a flowchart of a method 100 for encrypted similarity searching of a database. The method can be performed by a similarity search system. The methods described in connection with the figures are provided as examples only, and shall be understood not to limit the scope of the disclosure. The similarity search system can be any of the systems described or otherwise envisioned herein. The similarity search system can be a single system or multiple different systems.

Figure 2:
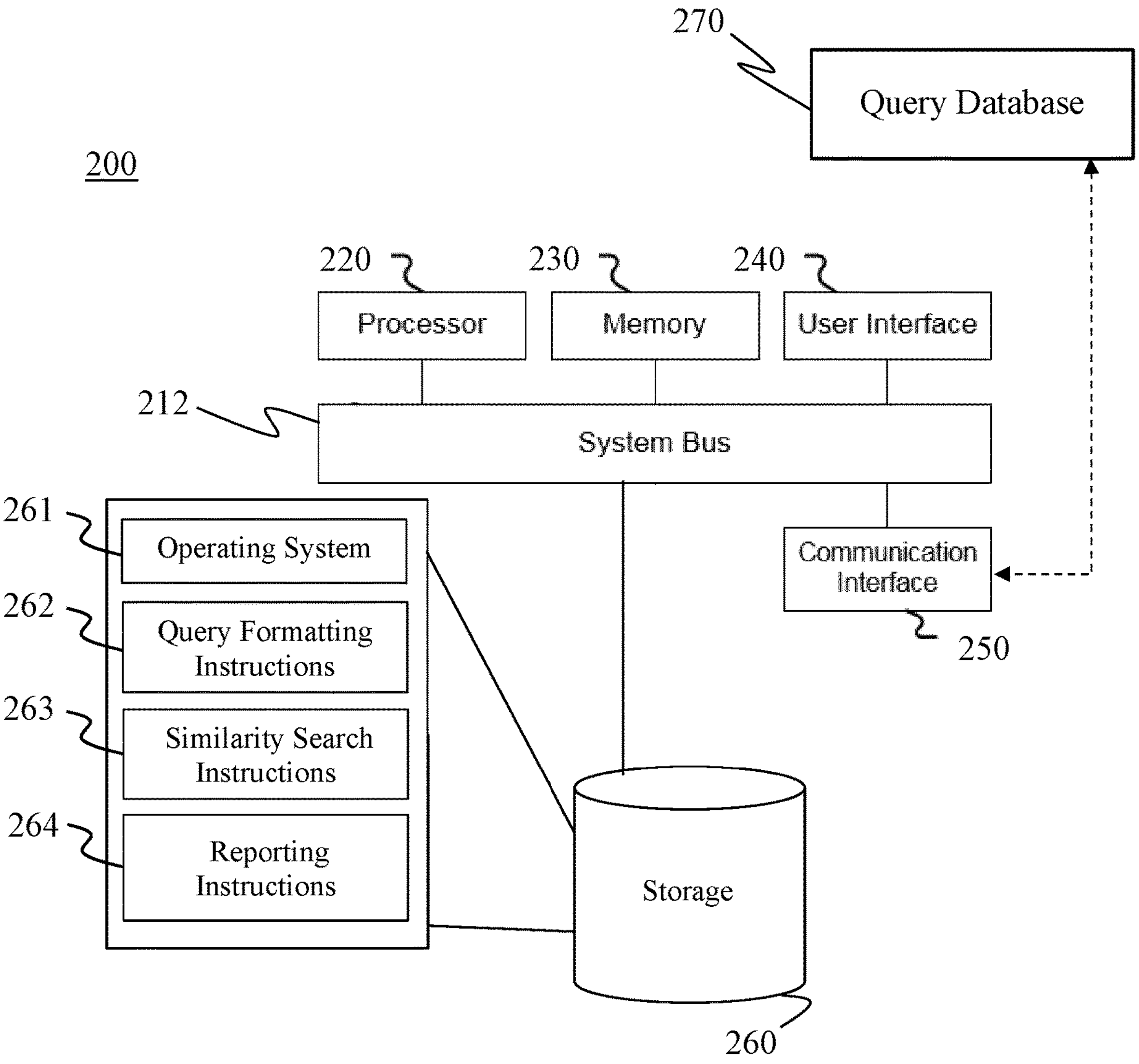
FIG. 2 is a schematic representation of a similarly search system, in accordance with an embodiment.

At step 110 of the method, a similarity search system 200 is provided. Referring to an embodiment of a similarity search system 200 as depicted in FIG. 2, for example, the system comprises one or more of a processor 220, memory 230, user interface 240, communications interface 250, and storage 260, interconnected via one or more system buses 212. It will be understood that FIG. 2 constitutes, in some respects, an abstraction and that the actual organization of the components of the system 200 may be different and more complex than illustrated. Additionally, similarity search system 200 can be any of the systems described or otherwise envisioned herein. Other elements and components of system 200 are disclosed and/or envisioned elsewhere herein.

Method 100 using similarity search system 200 can be accomplished in many ways using many different types of data. For example, the method may be utilized in terms of FHIR files as that is the most common type of medical data that requires similarity search, but it could be any type of data. The goal of similarity search is, given a FHIR record, find the most similar record(s) in a database of FIR records. The most straightforward solution to this challenge would be to use the bit vector representations of the FHIR file fingerprints as the hash keys for a hash-table of homomorphically-encrypted data (the original FHIR files). This could be simply producing a bit vector of the given file through fingerprinting and then look into the hash table to find the match and the nearest entries. However, such an approach has the drawback that it leaks the bit vector value of the given file to the owner of the database. To counter this leak the methods and systems described or otherwise envisioned herein comprise an approach in which the system homomorphically encrypts one or more fixed size tables containing a random ordering of all the bit vector values of the FHIR files in the database and compares that against a homomorphic encryption of a table filled with the bit vector file of the file that is being queried.

At optional step 115 of the method, a database structure for similarity searching is generated. The database structure may be generated by the similarity search system, or by another system. The database structure comprises at least a fixed-size database table that is populated with a random ordering of homomorphically-encrypted fixed-length data fingerprints, each fixed-length data fingerprint representing a data file in the database. The fixed-size database table can be generated using known methods for generating data tables. The homomorphically-encrypted fixed-length data fingerprints can be generated according to the methods described or otherwise envisioned below and herein. Once generated, the database structure may be stored in a local or remote database or system. For example, the database structure may be a component of the similarity search system, or the similarity search system may otherwise be in wired and/or wireless communication with the generated and stored database structure.

At step 120 of the method, a database structure for similarity searching is provided. The database comprises a plurality of data items, which can be any data that might be queried or otherwise searched. For example, in one application the database comprises medical data, and the data items are Fast Healthcare Interoperability Resources (FHIR) files, although many other data types and applications are possible.

The database comprises a plurality of homomorphically-encrypted fixed-length data fingerprints, where each fixed-length data fingerprint represents a data file in the database. The homomorphically-encrypted fixed-length data fingerprints can be generated according to the methods described or otherwise envisioned below and herein. The homomorphically-encrypted fixed-length data fingerprints are randomly ordered in a fixed-size database table. For example, if the database comprises 100 different data items the fixed-size database table will comprise 100 rows of homomorphically-encrypted fixed-length data fingerprints, with each row representing one of the 100 data items.

The database may be a local or remote database or system. For example, the database may be a component of the similarity search system, or the similarity search system may otherwise be in wired and/or wireless communication with the generated and stored database.

At step 130 of the method, the similarity search system receives an encrypted query to be queried against the database. The query can be any data or anything else that can be used in a search or otherwise queried against a database. For example, in one implementation, the query comprises patient data and the database comprises data about a plurality of other patients, and the goal of the query is to identify patients within the plurality of other patients that are most similar. As another example, the query can be an update and the database is searched for similarity between data in the database and/or the database itself and the update.

The encrypted query can be received at the similarity search system, such as through a user interface. Alternatively, the query can be received from a remote system that is in wired and/or wireless communication with the similarity search system. Some or all of the similarity search system may be a cloud-based system. For example, the similarity search system may comprise a centralized database and one or more local or remote interfaces via which a query may be submitted or otherwise received.

At step 140 of the method, a fixed-length query data fingerprint is generated from the received encrypted query. The fixed-length query data fingerprint may be generated using known methods for generating fingerprints from data. According to an embodiment, a fixed-length data fingerprint comprises a fixed-length floating point value feature vector. According to an embodiment, the fixed-length floating point value feature vector includes a predetermined plurality of sub-feature vectors. The length of the fixed-length data fingerprint can be predetermined by a user or by the system. The length may be dependent upon, for example, the number of data items in a database, the type of data in the database, or other parameters of the database and/or query.

At step 150 of the method, the fixed-length query data fingerprint is homomorphically encrypted. A fixed-length data fingerprint, such as the fingerprinted data items in the database and the fingerprinted query, may be homomorphically encrypted using any suitable method for homomorphic encryption, including but not limited to the methods described or otherwise envisioned herein.

According to an embodiment, the method utilizes practical homomorphic encryption instead of true, fully homomorphic encryption, in that the method limits the amount of computation performed on the data to a fixed amount. Since the method may involve a known function such as genome querying or other types of querying, the method can limit the homomorphic encryption to exactly this function, enabling a boost in performance for storage and computation time by tweaking to perfection one or more parameters.

Further, using traditional or full homomorphic encryption schemes rather than practical homomorphic encryption, an encrypted piece of data will contain within it a certain amount of noise that pollutes the original data. This noise grows stronger during homomorphic computations, growing so large in size that it eventually overtakes the originally encrypted data, which at that point can no longer be correctly decrypted. As such, to perform many computations in a homomorphic encryption system, one must often refresh the homomorphically encrypted data to reduce this noise, particularly if the encrypted size of the encrypted data is small. It is this encrypted size, when and how to reduce noise, and other similar aspects that comprise the parameters which can be optimized to achieve a decently performing solution for querying homomorphically encrypted genomic data.

According to an embodiment, the practical homomorphic encryption utilizes a Ring LWE-based cryptosystem using power-of-2 cyclotomic rings of integers, such as that cited in Lyubashevsky et al., "On ideal lattices and learning with errors over rings," JACM (2013). In this cryptosystem, raw data is encoded in what is referred to as plaintext: polynomials operating in a space that is typically the polynomial quotient ring as follows in Equation 1:

$$Z_t[x]/(x^n+1) \quad \text{(Eq. 1)}$$

Conversely, the encrypted data, referred as the ciphertext are polynomials operating in a space that is typically the polynomial quotient ring as follows in Equation 2:

$$Z_q[x]/(x^n+1) \quad \text{(Eq. 2)}$$

In both cases, n is a power of 2, t is the modulo for the plaintext ring, and q is the modulo for the cipher text ring. Each input whether it be an integer or byte string of fixed length, must thus first be converted into plaintext the polynomial format, transforming into the ciphertext polynomial format after encryption.

According to an embodiment, one factor behind homomorphic encryption performance and the consecutive boom in homomorphic encryption solutions has been the introduction of Batching. Batching is a powerful technique that allows Single Instruction, Multiple Data (SIMD) operations to be performed on homomorphically encrypted data. As discussed herein, each input must be encoded into a plaintext polynomial, however, this is extremely wasteful as it encodes only one single integer into a plaintext polynomial that, in theory, has enough space to store thousands of such integers. In fact, the n used in both polynomial quotient rings is almost always at least 1024 or more. With batching, the method fills out the entire polynomial space with as much information as possible leveraging a certain ring isomorphism to do so in a way that respects both additional and multiplicational homomorphism. In computations where Single Instruction, Multiple Data operations can be used, batching can provide an enormous performance improvement making it one of the most powerful and important techniques in modern homomorphic encryption.

Thus, as described above, homomorphic encryption works by representing both the plaintext and the ciphertext by means of polynomials. When applying homomorphic encryption one must first choose certain parameters for these polynomials. The most critical parameter is the degree n, which is the exponent shared between both the plaintext and ciphertext polynomials that determines the number of terms in both polynomials. According to one embodiment, the method utilizes an n that is equal to the maximum size of the cuckoo hash tables, which is 8192. However, other values of n are possible.

According to embodiment, the method utilizes a plaintext modulus t that is 3686401, which is a prime number congruent to 1 module 2*n, in order to enable the plaintext to be viewed as a 2-by-(n/2) matrix with elements integers modulo this plaintext modulus. This choice allows the system to leverage SIMD operations and massively improve performance on large datasets—such as the cuckoo hash tables—by means of its batching technique. However, other values of the plaintext modulus t are possible.

According to embodiment, the final parameter q, the modulus of the ciphertext, is determined by the homomorphic encryption framework depending on the security level to be achieved. According to an embodiment, the system can utilize 128 bits of security. Although higher security levels such as 256 or 512 bits of security are possible, with homomorphic encryption more security means less flexibility to handle the inevitable noise that arises in computations. Accordingly, the system can utilize 128 bits of security, although other values of q are possible. According to an embodiment, the fixed-length query data fingerprint can be generated according to the methods and systems described in co-pending U.S. patent application Ser. No. 18/289,133, among other methods and systems.

Thus, the outcome of step 150 of the method is a homomorphically-encrypted fixed-length query data fingerprint which can be utilized in subsequent steps of the method. The homomorphically-encrypted fixed-length query data fingerprint can be utilized immediately or can be stored in local or remote storage for subsequent use.

As described above, the data items in the database against which the query will be queried can be fingerprinted and homomorphically encrypted using this same method. The plurality of homomorphically-encrypted fixed-length data fingerprints can be utilized immediately for querying or can be queried at any point in the future.

At step 160 of the method, the system generates a fixed-size query data fingerprint table, where each row is the same homomorphically-encrypted query data fingerprint. Each row of the query data fingerprint table will be compared to each row of the randomly ordered homomorphically-encrypted data fingerprints, each data fingerprint representing a data file in the database. Thus, the size of the fixed-size query data fingerprint table will be determined by the size of the fixed-size data fingerprint table in the database to be queried. Once generated, the fixed-size query data fingerprint table can be utilized immediately or can be stored in local or remote storage for subsequent querying.

Accordingly, the size of the fixed-size data fingerprint table in the database to be queried can be a parameter available to the querying entity such that the size of the query data fingerprint table can be determined, or the size of the fixed-size data fingerprint table in the database to be queried can be determined by requesting or otherwise receiving that information from the database.

Figure 3:
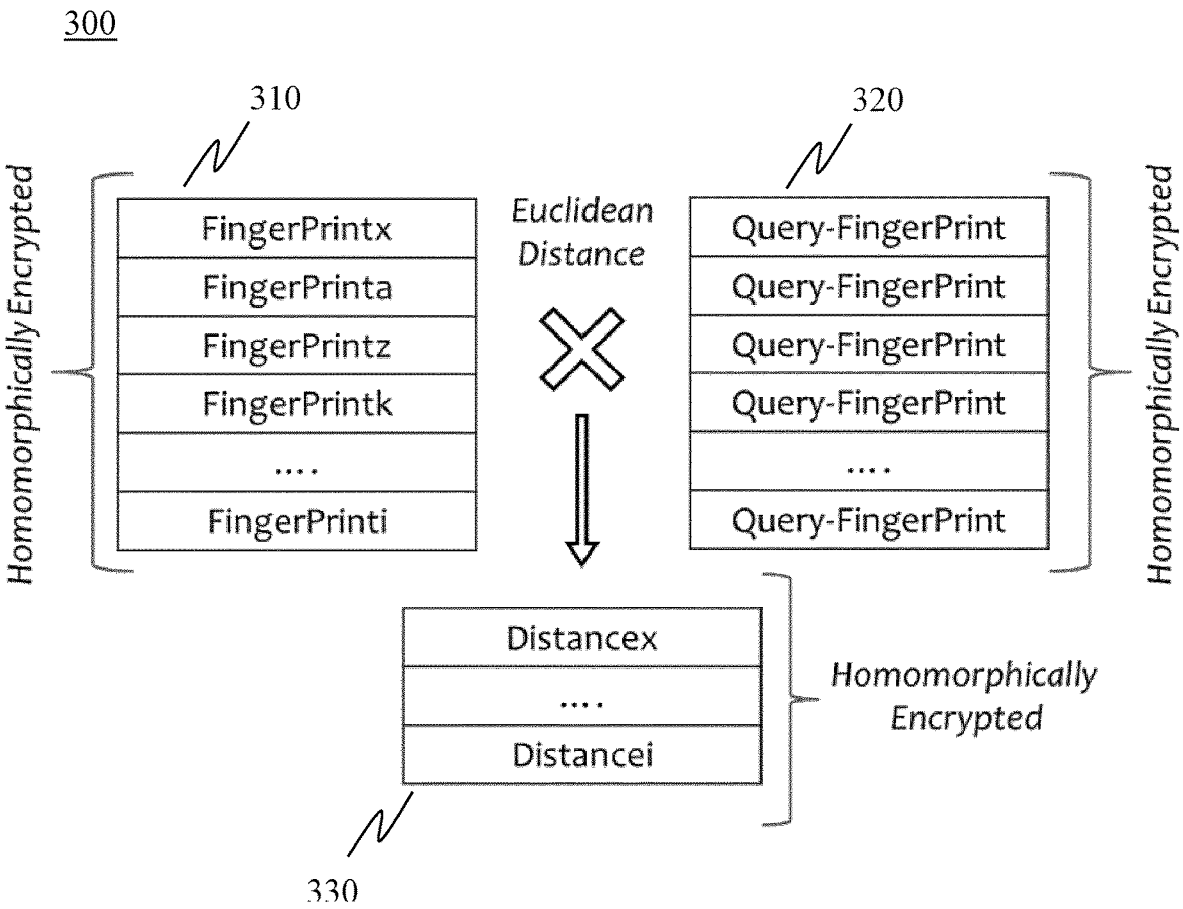
FIG. 3 is schematic representation of a method for querying a database using a similarity search system, in accordance with an embodiment.

For example, referring to FIG. 3 is a schematic representation of a method 300 for querying a database using the similarity search system. The system comprises a data fingerprint table 310 in the database to be queried, where the table comprises a fixed-size encompassing all data item fingerprints FingerPrintx . . . FingerPrinti. The size FingerPrintx . . . FingerPrinti of the data fingerprint table 310 is known or available information to the querying entity. Alternatively, the size FingerPrinti of the data fingerprint table 310 can be secured information such that the system generates the query data fingerprint table using this secure information without revealing it to the querying entity.

Thus, a query data fingerprint table 320 is generated with the Query-FingerPrint repeated in each row, and the number of rows is equivalent to the size FingerPrintx . . . FingerPrinti of the data fingerprint table 310. This enables row by row similarity comparison of the query to all data in the database.

Thus, at step 170 of the method, the system compares the query to the data in the database. According to an embodiment, the system uses the fixed-size query data fingerprint table and the fixed-size database table to compare the homomorphically-encrypted fixed-length query data fingerprint to every homomorphically-encrypted fixed-length data fingerprint. The comparison results in a generated distance between the query and each data item.

Referring again to FIG. 3, in one embodiment, is a schematic representation of a method 300 for querying a database using the similarity search system. The system comprises a data fingerprint table 310 of size FingerPrintx . . . FingerPrinti, and a query data fingerprint table 320 of the same size populated with the Query-FingerPrint repeated in each row. As each row of data fingerprint table 310 is compared to each row of the query data fingerprint table 320, a distance between the query and each data item, Distance, is generated: The Distance can be saved in a distance table 330 of size Distancex . . . Distancei, which will be the same size as data fingerprint table 310 and query data fingerprint table 320. Thus, for example, Distancex is the distance between FingerPrintx and Query-FingerPrint, and Distancei is the distance between FingerPrinti and Query-FingerPrint, and so on. According to an embodiment, the distance table 330 is also homomorphically encrypted.

According to an embodiment, once both the dataset table and query table have been encoded as plaintext and homomorphically encrypted, the system can search for matches or otherwise determine distance by means of a compare-add-multiply algorithm, although other methods are possible. For example, given the dataset table encrypted as a vector of ciphertext matrices $D_i$ with i ranging from 1 to V, the system can utilize the following equation 3:

$$v = \left\lceil \frac{VCF \text{ Row Count}}{7700} \right\rceil * \left\lceil \frac{RV}{10} \right\rceil \qquad \text{(Eq. 3)}$$

where RV is the bit size of the values stored in the table (20) and 2^10 is the chosen block size to encode these values.

Similarly, according to an embodiment, each query table X can be split into V ciphertext matrices $X_i$, for each query table i the system can perform the following computation over matrix rows j:

$$\sum_{j=1}^{\left\lceil \frac{RV}{10} \right\rceil} (D_i^j)^2 + (X_i^j)^2 - \left((D_i^j X_i^j) + (D_i^j X_i^j)\right) \qquad \text{(Eq. 4)}$$

According to an embodiment, this approach computes the square Euclidean distance for each matrix row. According to an embodiment, the indices for the rows that produce a zero or small number result are now ideal targets for duplication or high-similarity records.

According to an embodiment, this approach may leak to the querier who executes the operation on the homomorphically-encrypted data some sensitive data, such as the resulting Euclidean distance information. The resulting Euclidean distance information could be used by a possibly malicious to guess other bit vector values present in the homomorphically encrypted table. The smaller the Euclidean distance the more feasible this leakage. However, while the bit vectors preserve locality they are not explicitly reversible. An attacker will not be able to gain knowledge of any particular record but might be able to extract knowledge about of what kind of records are in the homomorphically-encrypted dataset.

At step 180, the system uses the generated distance between the homomorphically-encrypted fixed-length query data fingerprint and every homomorphically-encrypted fixed-length data fingerprint to identify one or more data files in the database having a minimal generated distance, or no distance, or a distance above or below a predetermined threshold. According to an embodiment the system or query may comprise a request or parameter or user setting that identifies a desired distance between the homomorphically-encrypted fixed-length query data fingerprint and a homomorphically-encrypted fixed-length data fingerprint in the database. For example, the desired distance may be 0 to identify identical or nearly identical data. As another example, the desired distance may be as small as possible to identify data as close to the query as possible.

According to an embodiment the system or query may comprise a request or parameter or user setting that identifies a desired number of data items to be identified in the database using the query. For example, the system or query may comprise information or a parameter that results in y number of items being returned in response to the query, where these items are they closest number of data items.

Referring again to FIG. 3, in one embodiment, is a schematic representation of a method 300 for querying a database using the similarity search system. The system comprises a data fingerprint table 310 of size FingerPrintx . . . FingerPrinti, and a query data fingerprint table 320 of the same size populated with the Query-FingerPrint repeated in each row. As each row of data fingerprint table 310 is compared to each row of the query data fingerprint table 320, a distance between the query and each data item, Distance, is generated. Thus, at step 180 of the method, one or more items Distancex . . . Distancei in the distance table 330 are identified as being a distance most responsive to the query. For example, according to an embodiment, any Distance=0 may be responsive to a query, and thus the FingerPrint that resulted in Distance=0 is identified as response to the query. As another example, any Distance less than a predetermined, programmed, or user-defined threshold (or alternatively, any Distance greater than the threshold) may identify the one or more FingerPrint that are responsive to the query.

At step 190 of the method, the system may provide a response to the query or other report to a user via a user interface 240 of the similarly search system 200, comprising an identification of one or more data files identified by the similarity search as being suitably similar to query. According to an embodiment, the system may display a report on a display of the system. The display may comprise information about the query, the responsive data, and/or one or more parameters utilized for similarity searching. Other information is possible. Alternatively, the report may be communicated by wired and/or wireless communication to another device. For example, the system may communicate the report to a mobile phone, computer, laptop, wearable device, and/or any other device configured to allow display and/or other communication of the report.

According to an embodiment, the homomorphic encryption system may be implemented in C++ using Microsoft's SEAL library, although other implementations are possible. The implementation can utilize the Brakerski/Fan-Vercauteren scheme for the homomorphic ciphertext (see Fan et al., "Somewhat Practical Fully Homomorphic Encryption," Cryptology ePrintArchive, Report 2012/144). Tests can consist of creating compressed fingerprints for all files and computing similarity quotients based on these fingerprints between all files.

Example

The following is an example of similarity searching using the systems and methods described or otherwise envisioned herein. It will be recognized that this is just one possible application or embodiment of the systems and methods described or otherwise envisioned herein, and thus is a non-limiting example.

Figure 4:
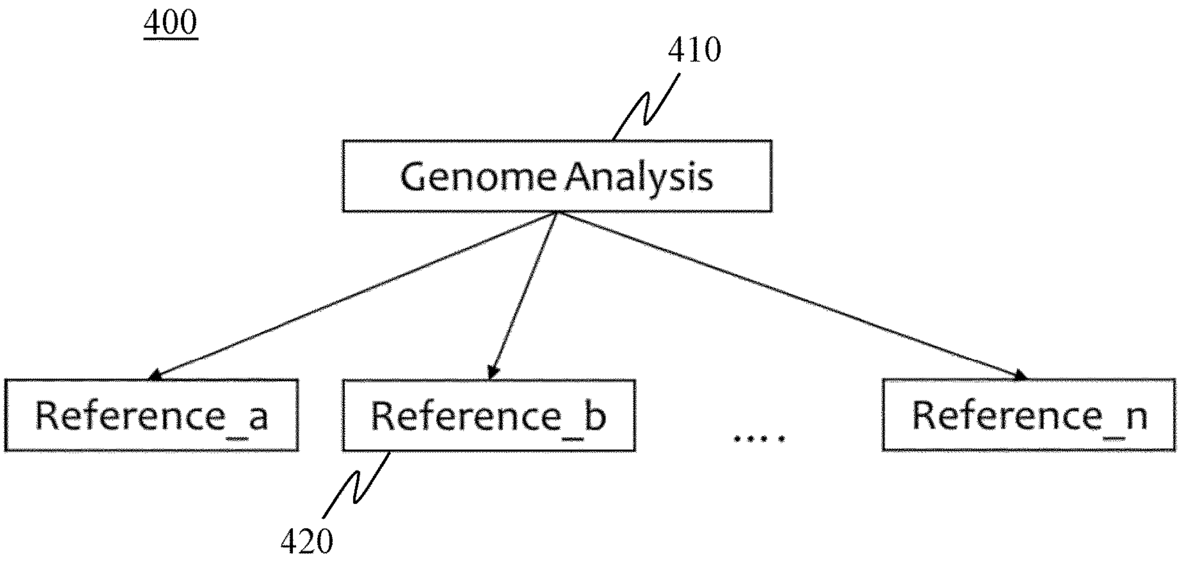
FIG. 4 is schematic representation of an approach using a similarity search system, in accordance with an embodiment.

In this example, the systems and methods described or otherwise envisioned herein are utilized to compare a genomic query to one or more reference genomes. Indeed, one important use case for secure updates, of a database for example, is to determine what cases should be re-evaluated without leaking the actual case information. In numerous setups whether it be knowledge databases or active patient cases, the active case may depend on underlying references amenable to change. For, example, referring to FIG. 4 is a case 400 in which a Genome Analysis 410 is compared to different references (Reference_a, Reference_b, . . . Reference_n) 410. Indeed, in genomic knowledge databases and user cases the core case can be made up of crucial references that drive the understanding of the genomic analysis.

One clear pattern within genomics is that the underlying references are modified frequently. Because these references leak privacy sensitive data such as the involved diseases for the case, evaluating such modifications and their effect on the genome analysis is a valuable use case for homomorphic encryption. Thus, the following solution architecture is proposed to enable the homomorphic encryption and searching methods and systems described or otherwise envisioned herein. For example, given a vector of fingerprints of references for a genome analysis GA:

$$\overrightarrow{GA} = \langle r_{d1}, \ldots\ r_{gn} \rangle \quad \text{(Eq. 5)}$$

And an up-to-date database of references RD:

$$RD = \langle r_{d1}, \ldots\ r_{dn} \rangle \quad \text{(Eq. 6)}$$

On these two vectors GA, RD performs the Euclidean distance operation as explained here. To quickly analyze whether a noteworthy change has happened one can perform the simple following computation:

$$\delta = \sum_{j=0}^{n} D_i \quad \text{(Eq. 6)}$$

If there is a significant difference, then there is a change and that information can be reported. The change or difference can then activate one or more actions that can occur to the reference or query as desired.

Referring to FIG. 2, in accordance with an embodiment, is a schematic representation of a similarity search system 200. System 200 may be any of the systems described or otherwise envisioned herein, and may comprise any of the components described or otherwise envisioned herein. It will be understood that FIG. 2 constitutes, in some respects, an abstraction and that the actual organization of the components of the system 200 may be different and more complex than illustrated.

According to an embodiment, system 200 comprises a processor 220 capable of executing instructions stored in memory 230 or storage 260 or otherwise processing data to, for example, perform one or more steps of the method. Processor 220 may be formed of one or multiple modules. Processor 220 may take any suitable form, including but not limited to a microprocessor, microcontroller, multiple microcontrollers, circuitry, field programmable gate array (FPGA), application-specific integrated circuit (ASIC), a single processor, or plural processors.

Memory 230 can take any suitable form, including a non-volatile memory and/or RAM. The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices. The memory can store, among other things, an operating system. The RAM is used by the processor for the temporary storage of data. According to an embodiment, an operating system may contain code which, when executed by the processor, controls operation of one or more components of system 200. It will be apparent that, in embodiments where the processor implements one or more of the functions described herein in hardware, the software described as corresponding to such functionality in other embodiments may be omitted.

User interface 240 may include one or more devices for enabling communication with a user. The user interface can be any device or system that allows information to be conveyed and/or received, and may include a display, a mouse, and/or a keyboard for receiving user commands. In some embodiments, user interface 240 may include a command line interface or graphical user interface that may be presented to a remote terminal via communication interface 250. The user interface may be located with one or more other components of the system, or may located remote from the system and in communication via a wired and/or wireless communications network.

Communication interface 250 may include one or more devices for enabling communication with other hardware devices. For example, communication interface 250 may include a network interface card (NIC) configured to communicate according to the Ethernet protocol. Additionally, communication interface 250 may implement a TCP/IP stack for communication according to the TCP/IP protocols. Various alternative or additional hardware or configurations for communication interface 250 will be apparent.

Storage 260 may include one or more machine-readable storage media such as read-only memory (ROM), random-access memory (RAM), magnetic disk storage media, optical storage media, flash-memory devices, or similar storage media. In various embodiments, storage 260 may store instructions for execution by processor 220 or data upon which processor 220 may operate. For example, storage 260 may store an operating system 261 for controlling various operations of system 200.

It will be apparent that various information described as stored in storage 260 may be additionally or alternatively stored in memory 230. In this respect, memory 230 may also be considered to constitute a storage device and storage 260 may be considered a memory. Various other arrangements will be apparent. Further, memory 230 and storage 260 may both be considered to be non-transitory machine-readable media. As used herein, the term non-transitory will be understood to exclude transitory signals but to include all forms of storage, including both volatile and non-volatile memories.

While system 200 is shown as including one of each described component, the various components may be duplicated in various embodiments. For example, processor 220 may include multiple microprocessors that are configured to independently execute the methods described herein or are configured to perform steps or subroutines of the methods described herein such that the multiple processors cooperate to achieve the functionality described herein. Further, where one or more components of system 200 is implemented in a cloud computing system, the various hardware components may belong to separate physical systems. For example, processor 220 may include a first processor in a first server and a second processor in a second server. Many other variations and configurations are possible.

The system may comprise or be in communication with a query database 270. The query database is any database of information, such as a medical database. The query database may be generated by the similarity search system, or by another system. The database structure comprises at least a fixed-size database table that is populated with a random ordering of homomorphically-encrypted fixed-length data fingerprints, each fixed-length data fingerprint representing a data file in the database. The fixed-size database table can be generated using known methods for generating data tables. The homomorphically-encrypted fixed-length data fingerprints can be generated according to the methods described or otherwise envisioned below and herein.

According to an embodiment, storage 260 of system 200 may store one or more algorithms, modules, and/or instructions to carry out one or more functions or steps of the methods described or otherwise envisioned herein. For example, the system may comprise, among other instructions or data, query formatting instructions 262, similarity search instructions 263, and/or reporting instructions 264, among many other possible instructions and/or data.

According to an embodiment, query formatting instructions 262 direct the system to receive and/or process an encrypted query to be utilized by the similarity search system. For example, the system can receive an encrypted query to be queried against the database, which can be any data or anything else that can be used in a search or otherwise queried against a database. The query can be received at the similarity search system, such as through a user interface. Alternatively, the query can be received from a remote system that is in wired and/or wireless communication with the similarity search system.

According to an embodiment, the query formatting instructions 262 further direct the system to generate a fixed-length query data fingerprint from the received query. The fixed-length query data fingerprint may be generated using known methods for generating fingerprints from data. According to an embodiment, a fixed-length data fingerprint comprises a fixed-length floating point value feature vector.

According to an embodiment, the query formatting instructions 262 further direct the system to homomorphically encrypt the fixed-length query data fingerprint. The fixed-length query data fingerprint may be homomorphically encrypted using any suitable method for homomorphic encryption, including but not limited to the methods described or otherwise envisioned herein.

According to an embodiment, the query formatting instructions 262 further direct the system to generate a fixed-size query data fingerprint table, where each row is the same homomorphically-encrypted query data fingerprint. Each row of the query data fingerprint table will be compared to each row of the randomly ordered homomorphically-encrypted data fingerprints, each data fingerprint representing a data file in the database. Thus, the size of the fixed-size query data fingerprint table will be determined by the size of the fixed-size data fingerprint table in the database to be queried. Once generated, the fixed-size query data fingerprint table can be utilized immediately or can be stored in local or remote storage for subsequent querying.

According to an embodiment, similarity search instructions 263 direct the system to compare the query to the data in the database. According to an embodiment, the system uses the fixed-size query data fingerprint table and the fixed-size database table to compare the homomorphically-encrypted fixed-length query data fingerprint to every homomorphically-encrypted fixed-length data fingerprint. The comparison results in a generated distance between the query and each data item.

According to an embodiment, the similarity search instructions 263 also direct the system to utilize this generated distance between the homomorphically-encrypted fixed-length query data fingerprint and every homomorphically-encrypted fixed-length data fingerprint to identify one or more data files in the database having a minimal generated distance, or no distance, or a distance above or below a predetermined threshold. According to an embodiment the system or query may comprise a request or parameter or user setting that identifies a desired distance between the homomorphically-encrypted fixed-length query data fingerprint and a homomorphically-encrypted fixed-length data fingerprint in the database. For example, the desired distance may be 0 to identify identical or nearly identical data. As another example, the desired distance may be as small as possible to identify data as close to the query as possible.

According to an embodiment, reporting instructions 264 direct the system to generate and provide a report to a user via a user interface comprising an identification of one or more data items identified by the similarity search as being suitably similar to query. According to an embodiment, the system may display a report on a display of the system. The display may comprise information about the identified data files, the query, and/or one or more parameters utilized for similarity searching. Other information is possible. Alternatively, the report may be communicated by wired and/or wireless communication to another device. For example, the system may communicate the report to a mobile phone, computer, laptop, wearable device, and/or any other device configured to allow display and/or other communication of the report.

According to an embodiment, the similarity search system is configured to process many thousands or millions of data items in the database, including to generate a fingerprint of each data item, to homomorphically encrypt each data item, and to create a table comprising each homomorphically-encrypted fixed-length data fingerprint. In addition, the similarity search system generates a fingerprint of the query, homomorphically encrypts the query, and generates a table comprising the homomorphically-encrypted fixed-length query fingerprint. Further, the similarity search system compares the homomorphically-encrypted fixed-length query fingerprint to each homomorphically-encrypted fixed-length data fingerprint, thereby generating a distance for each comparison. This requires processing of millions of data-points. Thus, generating a distance between a query and each data item in a database comprises a process with a volume of calculation and analysis that a human brain cannot accomplish in a lifetime, or multiple lifetimes. Further, by providing faster and more secure similarity searching, the methods and systems described or otherwise envisioned herein represent a technological improvement over previous systems that are not capable of performing the same functionality in the same way at the even similar speeds.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A method for encrypted similarity searching of a database in a server, comprising:

providing a database in the server, the database comprising a plurality of homomorphically-encrypted fixed-length data fingerprints, each fixed-length data fingerprint representing a data file in the database, wherein the plurality of homomorphically-encrypted fixed-length data fingerprints are randomly ordered in a fixed-size database table;

receiving an encrypted query from a remote system to be queried against the database in a similarity search in the server;

generating in the server, from the received query, a fixed-length query data fingerprint in the database;

homomorphically encrypting the fixed-length query data fingerprint in the server;

generating a fixed-size query data fingerprint table in the server, wherein the size of the fixed-size query data fingerprint table is the same as the size of the fixed-size database table;

comparing in the server, using the fixed-size query data fingerprint table and the fixed-size database table, the homomorphically-encrypted fixed-length query data fingerprint to every homomorphically-encrypted fixed-length data fingerprint, wherein each comparison generates a distance, wherein the distance between each homomorphically-encrypted fixed-length data fingerprint and the homomorphically-encrypted fixed-length query data fingerprint is used to populate a distance table, and wherein the distance table is of the same size as the fixed-size query data fingerprint table and the fixed-size database table;

identifying in the server, using the generated distance between the homomorphically-encrypted fixed-length query data fingerprint and every homomorphically-encrypted fixed-length data fingerprint, one or more data files in the database having a generated distance that is less than or equal to a predetermined distance or a user-defined threshold distance; and reporting the identified one or more data files in the database in the server.

2. The method of claim 1, further comprising the step of generating the plurality of homomorphically-encrypted fixed-length data fingerprints in the server.

3. The method of claim 1, further comprising the step of generating the fixed-size database table comprising the plurality of homomorphically-encrypted fixed-length data fingerprints in the server, wherein the plurality of homomorphically-encrypted fixed-length data fingerprints are randomly ordered within the fixed-size database table.

4. The method of claim 1, wherein the generated distance is homomorphically encrypted.

5. The method of claim 1, wherein the reporting further comprises the generated distance between the query and the identified one or more data files in the database.

6. The method of claim 1, wherein the encrypted query is an updated version of a database, and wherein each fixed-length data fingerprint represents a version of a database or a version of a data file in the database.

7. The method of claim 1, wherein the encrypted query is an updated version of a reference genome, and wherein each fixed-length data fingerprint represents a reference genome.

8. A system for encrypted similarity searching of a database in a server, comprising:

a database in the server, the database comprising a plurality of homomorphically-encrypted fixed-length data fingerprints, each fixed-length data fingerprint representing a data file in the database, wherein the plurality of homomorphically-encrypted fixed-length data fingerprints are randomly ordered in a fixed-size database table;

an encrypted query from a remote system to be queried against the database in a similarity search in the server; and a processor configured to: (i) generate, from the query, a fixed-length query data fingerprint in the database; (ii) homomorphically encrypt the fixed-length query data fingerprint in the server; (iii) generate a fixed-size query data fingerprint table in the server, wherein the size of the fixed-size query data fingerprint table is the same as the size of the fixed-size database table; (iv) compare in the server, using the fixed-size query data fingerprint table and the fixed-size database table, the homomorphically-encrypted fixed-length query data fingerprint to every homomorphically-encrypted fixed-length data fingerprint, wherein each comparison generates a distance, wherein the distance between each homomorphically-encrypted fixed-length data fingerprint and the homomorphically-encrypted fixed-length query data fingerprint is used to populate a distance table, and wherein the distance table is of the same size as the fixed-size query data fingerprint table and the fixed-size database table; (v) identify in the server, using the generated distance between the homomorphically-encrypted fixed-length query data fingerprint and every homomorphically-encrypted fixed-length data fingerprint, one or more data files in the database having a generated distance that is less than or equal to a predetermined distance or a user-defined threshold distance; and (vi) generate a report comprising the identified one or more data files in the database in the server.

9. The system of claim 8, further comprising a user interface configured to provide the generated report.

10. The system of claim 8, wherein the processor is further configured to generate the plurality of homomorphically-encrypted fixed-length data fingerprints.

11. The system of claim 8, wherein the processor is further configured to generate the fixed-size database table comprising the plurality of homomorphically-encrypted fixed-length data fingerprints, wherein the plurality of homomorphically-encrypted fixed-length data fingerprints are randomly ordered within the fixed-size database table.

12. The system of claim 8, wherein the distance table is homomorphically encrypted.

13. The system of claim 8, wherein the predetermined distance or user-defined threshold distance is determined by a predetermined setting or is user defined.

14. The method of claim 1, wherein the predetermined distance or user-defined threshold distance is determined by a predetermined setting or is user defined.

15. The system of claim 8, wherein the report further comprises the generated distance between the query and the identified one or more data files in the database.

16. The system of claim 8, wherein the report further comprises, for each one of the one or more data files identified in the database, the generated distance between the respective homomorphically-encrypted fixed-length query data fingerprint and homomorphically-encrypted fixed-length data fingerprint.

17. The system of claim 8, wherein the encrypted query is an updated version of a database, and wherein each fixed-length data fingerprint represents a version of a database or a version of a data file in the database.

18. The system of claim 8, wherein the encrypted query is an updated version of a reference genome, and wherein each fixed-length data fingerprint represents a reference genome.

* * * * *